US010349093B2

(12) United States Patent
Rai et al.

(10) Patent No.: US 10,349,093 B2
(45) Date of Patent: Jul. 9, 2019

(54) SYSTEM AND METHOD FOR DERIVING TIMELINE METADATA FOR VIDEO CONTENT

(71) Applicant: Cisco Technology Inc., San Jose, CA (US)

(72) Inventors: Pete Rai, Egham (GB); David Richardson, Maidenhead (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 177 days.

(21) Appl. No.: 14/202,568

(22) Filed: Mar. 10, 2014

(65) Prior Publication Data

US 2015/0254341 A1 Sep. 10, 2015

(51) Int. Cl.
| | | |
|---|---|---|
| *G06F 16/24* | (2019.01) | |
| *H04N 21/234* | (2011.01) | |
| *G06F 16/245* | (2019.01) | |
| *H04H 60/56* | (2008.01) | |
| *H04H 60/37* | (2008.01) | |
| *H04N 21/266* | (2011.01) | |
| *H04N 21/84* | (2011.01) | |
| *G06F 16/9032* | (2019.01) | |

(52) U.S. Cl.
CPC ..... *H04N 21/23418* (2013.01); *G06F 16/245* (2019.01); *H04H 60/37* (2013.01); *H04H 60/56* (2013.01); *H04N 21/26603* (2013.01); *H04N 21/84* (2013.01); *G06F 16/90328* (2019.01)

(58) Field of Classification Search
CPC ......... G06F 17/30017; G06F 17/30093; G06F 16/245; G06F 16/90328; G06F 16/40; G06F 16/70
See application file for complete search history.

(56) References Cited

U.S. PATENT DOCUMENTS

| | | | | |
|---|---|---|---|---|
| 6,435,737 | B1 * | 8/2002 | Wise ..................... | G06F 9/3867 |
| | | | | 375/E7.093 |
| 6,850,252 | B1 * | 2/2005 | Hoffberg ............ | G06K 9/00369 |
| | | | | 348/E7.061 |

(Continued)

FOREIGN PATENT DOCUMENTS

| | | |
|---|---|---|
| EP | 2 530 675 A2 | 12/2012 |
| EP | 2530675 A2 | 12/2012 |

(Continued)

OTHER PUBLICATIONS

Marszalek et al., "Actions in Context", 2009, IEEE.*

(Continued)

*Primary Examiner* — Apu M Mofiz
*Assistant Examiner* — Sheryl L Holland
(74) *Attorney, Agent, or Firm* — Merchant & Gould P.C.

(57) ABSTRACT

In one embodiment, a method implemented on a computing device for deriving timeline metadata for video content includes: capturing timeline elements through analysis of at least one of audio, visual or language aspects of the video content, interpreting the timeline elements according to associated inferences as indicative of timeline states, evaluating combinations of the timeline states according to a set of rules to derive timeline metadata, where the timeline metadata is associated with at least a portion of the video content.

20 Claims, 3 Drawing Sheets

(56) References Cited

U.S. PATENT DOCUMENTS

| | | | |
|---|---|---|---|
| 2003/0088872 A1* | 5/2003 | Maissel | G11B 27/002 725/46 |
| 2003/0123541 A1* | 7/2003 | Jun | H04N 5/147 375/240.08 |
| 2003/0163832 A1 | 8/2003 | Tsuria et al. | |
| 2005/0097606 A1* | 5/2005 | Scott, III | H04N 5/44543 725/52 |
| 2005/0120391 A1* | 6/2005 | Haynie | H04H 60/07 725/135 |
| 2005/0220439 A1* | 10/2005 | Carton | G11B 27/329 386/240 |
| 2005/0251532 A1* | 11/2005 | Radhakrishnan | G06F 17/30787 |
| 2006/0200253 A1* | 9/2006 | Hoffberg | G05B 15/02 700/19 |
| 2007/0067800 A1* | 3/2007 | Wachtfogel | G11B 27/002 725/42 |
| 2007/0070069 A1* | 3/2007 | Samarasekera | G06F 3/011 345/427 |
| 2007/0101266 A1* | 5/2007 | Kim | G11B 27/105 715/719 |
| 2007/0214488 A1* | 9/2007 | Nguyen | G06F 17/30796 725/134 |
| 2007/0276926 A1* | 11/2007 | LaJoie | G06F 21/10 709/219 |
| 2007/0292106 A1* | 12/2007 | Finkelstein | G11B 27/28 386/241 |
| 2008/0297588 A1* | 12/2008 | Kurtz | H04N 7/147 348/14.08 |
| 2009/0052864 A1* | 2/2009 | Ohde | H04N 5/44543 386/298 |
| 2009/0055385 A1* | 2/2009 | Jeon | H04N 5/44543 |
| 2009/0129678 A1* | 5/2009 | Sukeda | G06K 9/00711 382/181 |
| 2009/0133049 A1* | 5/2009 | Bradley | H04N 7/162 725/28 |
| 2009/0205009 A1* | 8/2009 | Kim | H04N 21/4314 725/139 |
| 2009/0241142 A1* | 9/2009 | Schuster | G06Q 30/02 725/32 |
| 2010/0138865 A1* | 6/2010 | Rai | H04N 7/16 725/44 |
| 2011/0296474 A1* | 12/2011 | Babic | H04N 21/21 725/87 |
| 2012/0177256 A1* | 7/2012 | Keefe | G06F 19/322 382/115 |
| 2012/0192217 A1* | 7/2012 | Jeong | H04N 21/252 725/14 |
| 2012/0254917 A1* | 10/2012 | Burkitt | G06F 17/30817 725/40 |
| 2012/0271828 A1* | 10/2012 | Raghunath | G06F 17/30669 707/739 |
| 2012/0307840 A1* | 12/2012 | Ashley | H04N 21/234327 370/432 |
| 2013/0014144 A1* | 1/2013 | Bhatia | H04N 21/252 725/13 |
| 2013/0088616 A1* | 4/2013 | Ingrassia, Jr. | H04N 5/772 348/231.5 |
| 2013/0191745 A1* | 7/2013 | Vella | G06F 3/01 715/716 |
| 2013/0282483 A1* | 10/2013 | Ruarte | G06Q 30/02 705/14.49 |
| 2014/0020017 A1* | 1/2014 | Stern | H04N 21/23611 725/34 |
| 2014/0082645 A1* | 3/2014 | Stern | H04N 21/26258 725/13 |
| 2014/0153900 A1* | 6/2014 | Tanaka | G11B 27/034 386/239 |
| 2014/0233923 A1* | 8/2014 | Bradley | H04N 21/25891 386/298 |
| 2014/0359649 A1* | 12/2014 | Cronk | H04N 21/23109 725/14 |
| 2015/0193497 A1* | 7/2015 | Tallamy | G06F 17/30386 707/749 |
| 2016/0162808 A1* | 6/2016 | Feng | H04N 21/234336 706/12 |
| 2017/0133022 A1* | 5/2017 | Gurijala | G10L 19/018 |

FOREIGN PATENT DOCUMENTS

| | | |
|---|---|---|
| WO | 0103008 A1 | 1/2001 |
| WO | WO 01/03008 A1 | 1/2001 |

OTHER PUBLICATIONS

Kovashka et al., "Learning a Hierarchy of Discriminative Space-Time Neighborhood Features for Human Action Recognition", 2010, IEEE.*

Davis et al., "From Context to Content Leveraging Context to Infer Media Metadata", 2004, ACM.*

Song et al., "Multiple Feature Hasihing for Real Time Large Scale Near-Duplicate Video Retrieval", Dec. 1, 2011, ACM.*

Berrani et al., "TV Broadcast Macro-Segmentation: Metadata-Based vs. Content-Based Approaches", 2007, ACM.*

Naturel et al, "Fast Structuring of Large Television Streams Using Program Guides", 2007, Springer-Verlag.*

Snoek et al., "A Learned Lexicon-Driven Paradigm for Interactive Video Retrieval", 2006, IEEE.*

Partial International Search Report for PCT/IB2015/051261, dated Jun. 15, 2015.

Oct. 7, 2015 ISR for PCT/IB2015/051261.

Oct. 7, 2015 Written Opinion of ISA for PCT/IB2015/051261.

John Moulding. "Cisco Prepares for the Cloud Delivered Linear EPG" (Jul. 8, 2013).

"Help & FAQs" (zeebox 2014).

"SvncNow" (Civolution 2014).

"Video Trends Report Q4-2013" (Digitalsmiths 2014).

Examination Report issued by the European Patent Office in corresponding Patent Application No. EP15714280.3.

Office Action Issued in European Patent Application No. 15 714 280.5-1208, dated Sep. 20, 2018, 5 Pages.

Second Office Action Issued in Chinese Patent Application No. 201580013253.5 dated Feb. 22, 2019, 15 Pages.

* cited by examiner

| CLASS | ELEMENT | INFERENCES |
|---|---|---|
| VIDEO | ZOOMING CRANE SHOT | BIG BUDGET SHOW WITH HIGH PRODUCTION VALUES |
| AUDIO | INTERMITTENT LAUGHTER | LIGHT HEARTED SHOW, PERHAPS COMEDY |
| LANGUAGE | SPECIALIZED MOTORING VOCABULARY | A SHOW ABOUT CARS |
| LANGUAGE | RUDE OR VULGAR TERMS | AN ADULT SHOW |
| AUDIO | MULTIPLE SCREAMS | A HORROR SHOW |
| VIDEO | DOMINANT COLOR IS CONSTANTLY GREEN | A GRASS BASED SPORT |
| VIDEO | EXCESS FLESH TONES | NUDITY OR PORNOGRAPHY |

SYSTEM AND METHOD FOR DERIVING TIMELINE METADATA FOR VIDEO CONTENT

FIELD OF THE INVENTION

The present invention generally relates to characterizing television content and particularly, but not exclusively, to employing multi-variable analysis to do so.

BACKGROUND OF THE INVENTION

Television remains in demand for informing and entertaining people all over the world. To feed that demand, vast quantities of television content continue to be produced. New genres of television content continue to evolve, and new and improved methods for presenting and leveraging television content also continue to be developed by television producers, broadcasters, advertisers and third party suppliers.

BRIEF DESCRIPTION OF THE DRAWINGS

The present invention will be understood and appreciated more fully from the following detailed description, taken in conjunction with the drawings in which:

FIG. 3 is a simplified pictorial illustration of an exemplary class/element interpretation table, constructed and operative in accordance with an embodiment of the present invention.

DESCRIPTION OF EXAMPLE EMBODIMENTS

Overview

Figure 1:
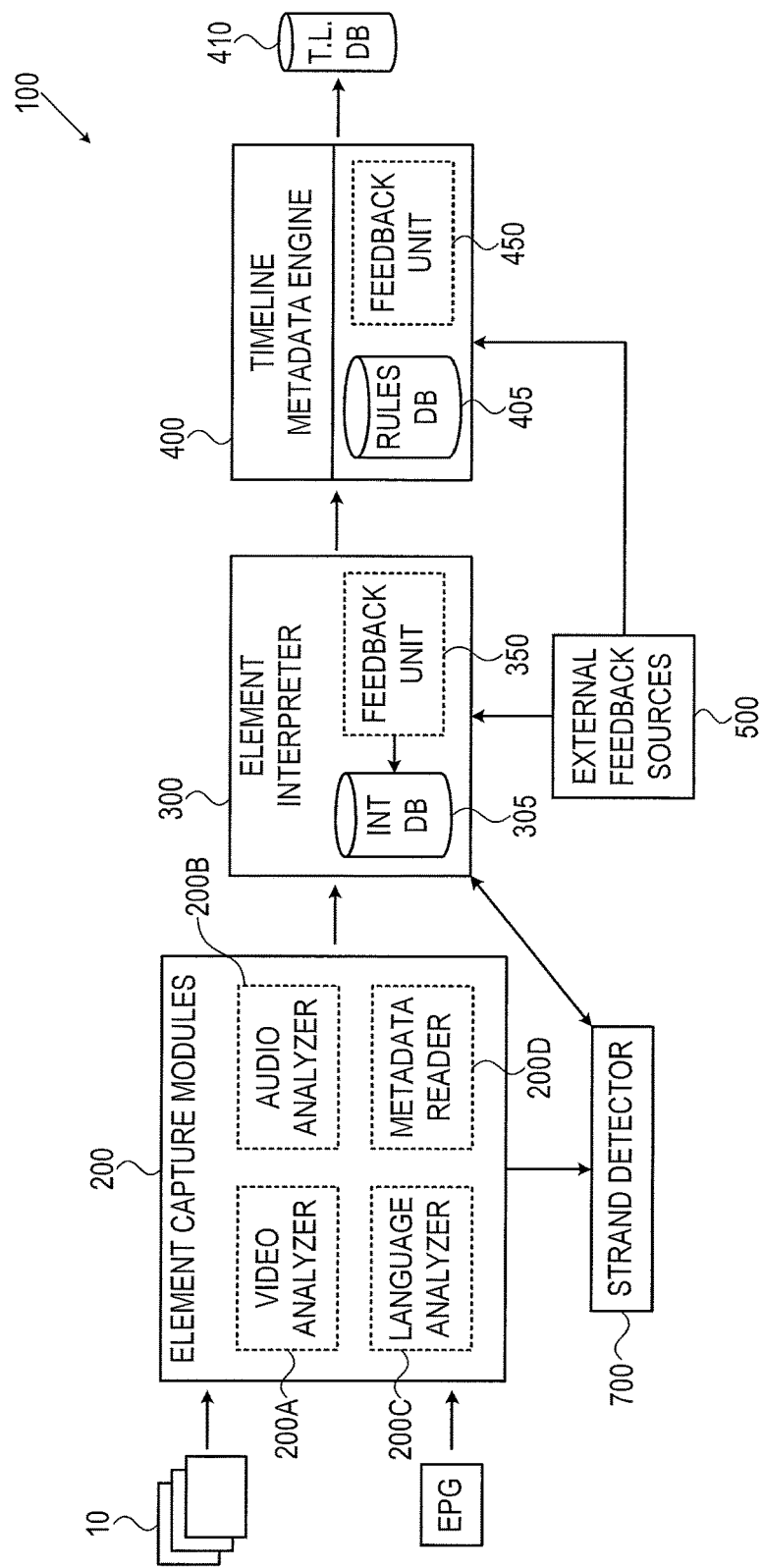
FIG. 1 is a simplified pictorial illustration of an exemplary video content timeline metadata generation system, constructed and operative in accordance with an embodiment of the present invention.

A method implemented on a computing device for deriving timeline metadata for video content includes: capturing timeline elements through analysis of at least one of audio, visual or language aspects of the video content, interpreting the timeline elements according to associated inferences as indicative of timeline states, evaluating combinations of the timeline states according to a set of rules to derive timeline metadata, where the timeline metadata is associated with at least a portion of the video content.

A timeline metadata derivation system implemented on a computing device includes: means for capturing timeline elements through analysis of at least one of the audio, visual or language aspects of the video content, means for interpreting the timeline elements according to associated inferences as indicative of timeline states, and means for evaluating combinations of the timeline states according to a set of rules to derive timeline metadata, where the timeline metadata is associated with at least a portion of the video content.

A video content timeline metadata generation system implemented on a computing device includes: at least one timeline element capture module operative to analyze video content items in order to at least detect timeline elements associated with at least points in time in the video content item, a timeline element interpreter operative to at least interpret the timeline elements as timeline states in accordance with associated inferences, and a timeline metadata engine operative to evaluate combinations of the timeline states according to a set of rules to derive timeline metadata, where the timeline metadata is associated with at least portions of the video content items.

DETAILED DESCRIPTION OF EXAMPLE EMBODIMENTS

Program metadata is typically associated with television program content. Common examples of such program metadata include a title, a synopsis, a genre, one or more images and cast information relating to a specific item of television program content. Such program metadata may be used to generate electronic program guides (EPGs) and/or printed listings information in newspapers and magazines and/or other content discovery mechanisms.

More complex uses for program metadata may require more specific information about the television program content. For example, some applications may require 'timeline metadata'; metadata that is associated with one or more points along the timeline of a television program, rather than being associated with the entire program as a single atomic entity. Timeline metadata may therefore be suitable for providing information relevant to a specific point during a program. For example, whereas program specific metadata such as that used to generate an EPG may indicate that the genre of a television program is a musical, timeline metadata may be used to indicate a specific time during the course of the television program a particular song actually begins or ends. Similarly, program specific metadata may indicate that a television program is a news show; timeline metadata may indicate a specific time at which the news stories begin or end, or when the news anchor is joined by a second newscaster.

It will be appreciated that timeline metadata may be leveraged to enhance a user's viewing experience while watching television program content. Additionally, there is an increasing trend of users using a second digital device such as, for example, a tablet, laptop computer or a smartphone while watching a television program. Timeline metadata may be used by applications running on the second device to provide the user with additional information and/or options associated with a given point in the television program. It will be appreciated that the applications running on the second device may or may not be directly linked to the television program or the television service. In either case, timeline metadata may be leveraged to provide additional value to the simultaneous use of two or more digital devices.

It will be appreciated that timeline metadata is often produced as a digital by-product of the production process. For example, the spatial position of the cameras used on a movie may be tracked for editing purposes. The speed and position of the news anchor reading an autocue may be calculated and/or used during production of the program. Unfortunately, at least until now, there has been no motivation to preserve this metadata; it is generally considered to be just digital waste. Accordingly, such metadata rarely escapes the production process and is generally unavailable for post-production uses.

There are some systems known in the art which may generate timeline metadata based on analysis of video assets. Examples of such systems are MetaFrame from DigitialSmiths, syncnow from Civolution, and Lunar from Cisco Systems. The metadata generated by these systems may then typically be used in second screen applications such as, for example, Zeebox. There are also engines that can generate post-facto timeline metadata that may be used for scene segmentation on DVDs or surfacing content in large video catalogues.

All these system/engines may be generally characterized as operating in the "data layer" of a video asset; they typically extract literal metadata signals directly from video data in order to generate the timeline metadata. Any timeline metadata that is generated may therefore limited to whatever metadata signals were explicitly included in the version of the video asset being analyzed, whether provided via broadcast or direct distribution, e.g. in a master copy for DVD production.

As will be described hereinbelow, the Inventors of the present invention have realized that additional timeline metadata may be generated from an analysis of the "information" or "knowledge" layer; i.e. by analyzing the video content itself, to derive additional information. Timeline metadata gleaned in such manner from the information layer may then be subjected to multi-variable analysis along with the literal metadata signals captured from the data layer in order to form a more holistic and semantically accurate view of the sense of an underlying story or context of the video content, thus providing additional information. Such multi-variable analysis uses the structural and systemic elements of the way video and audio content is constructed and played out, and may be done in sympathy with the structural and systemic elements that form a television system, rather than treating the show as an isolated piece of video, thus providing a deeper understanding about what the show is truly about.

Reference is now made to FIG. 1 which illustrates an exemplary video content timeline metadata generation system 100, constructed and operative in accordance with an embodiment of the present invention. System 100 comprises element capture modules 200, element interpreter 300 and timeline metadata engine 400. As will be discussed hereinbelow, video content 10 is processed by system 100 to provide timeline metadata which is stored in timeline metadata database 410. System 100 may be implemented as software and/or hardware components installed on one or more suitable computing devices. Accordingly, it will be appreciated that system 100 may comprise at least one data storage device, one or more data communications units capable of receiving and sending data communications, and at least one processor capable of processing computer instructions in order to provide at least provide the functionality described herein.

Figure 2:
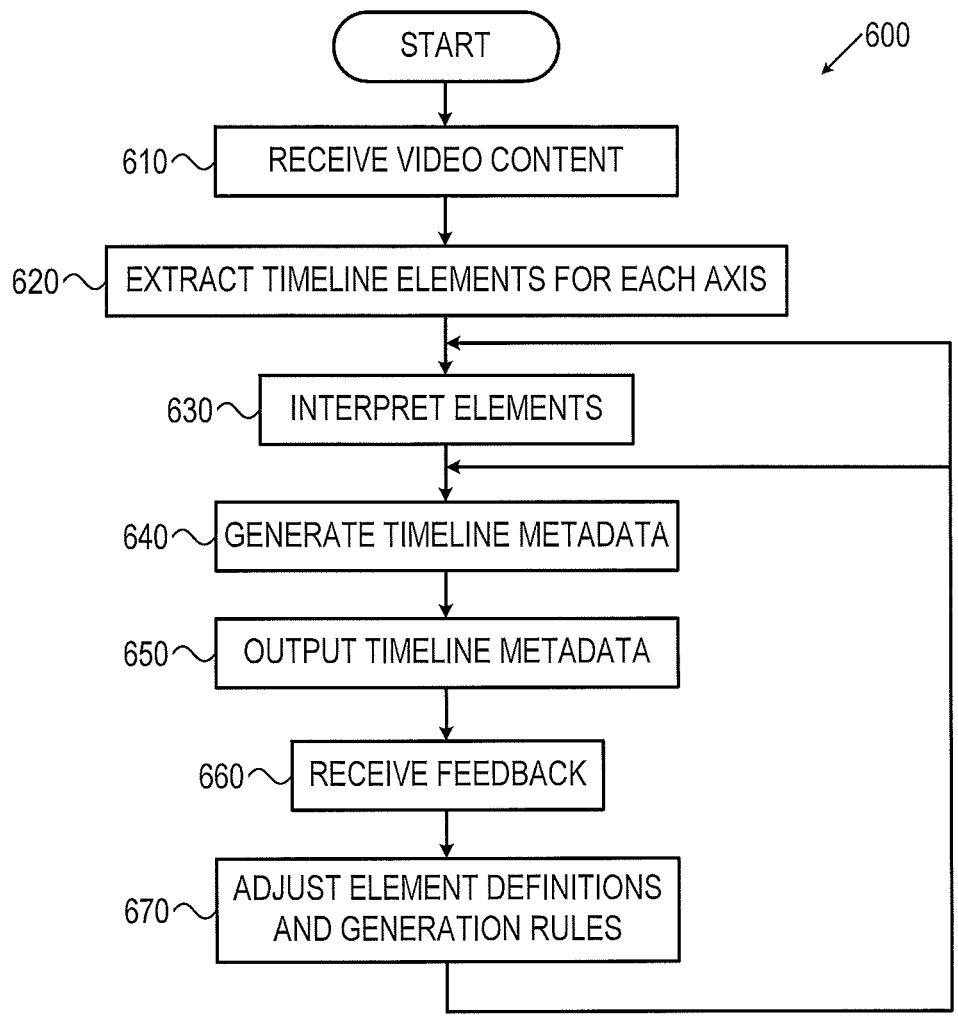
FIG. 2 is a block diagram of an exemplary timeline generation process to be performed by the system of FIG. 1.

Reference is now also made to FIG. 2 which illustrates an exemplary timeline generation process 600 to be performed by system 100. System 100 receives (step 610) video content 10 for analysis. It will be appreciated that the video content 10 may be received from any relevant source. For example, video content 10 may be received directly from a video content distributer, downloaded via an Internet connection, or directly from a television broadcast via various transmission routes such as satellite, cable, IP, DTT, etc. Accordingly, it will be similarly appreciated that system may comprise any suitable means such as are known in the art for receiving video content 10, such as for example, a video content file reader, a broadband data connection and/or a television broadcast receiver.

Timeline elements may be extracted (step 620) from video content 10 by element capture modules 200. It will be appreciated that timeline elements may be any element of information that may indicate or imply a current state or context at a given point or period of time during the play of video content 10. As will be described hereinbelow, some timeline elements may be indicative of a context for all or a part of video content 10.

As shown in FIG. 1, system 100 may comprise a multiplicity of modules 200. It will be appreciated that video content 10 may be analyzed according to different "axes" or classes of metadata. Each different axis may be associated with different types of timeline elements. For example, as discussed hereinabove, currently available systems may extract metadata that was explicitly included in video content 10. Such metadata may typically, but not exclusively, be used in EPG listings and may include, for example, information regarding the playout or content context of a television program. The playout context axis may generally refer to a class of metadata associated with the broadcast instance of the show. For example, playout timeline elements that may typically be read from video content 10 may include: broadcast date and time; broadcast channel; history of previous broadcasts; previous/next show; and/or the presence of adverts. The content context axis may generally refer to metadata about the show itself. For example, content timeline elements that may typically be read from video content 10 may include: series/episode structure; cast and crew; year of production; country of production; and/or genre. It will be appreciated that content and/or extended playout (such as previous broadcasts) timeline elements may not necessarily present in the video content 10. They may also be pulled from another store, or database, once the content has been identified and an identifying key is available. For example, a key in the metadata included in video content 10 may be used to identify it as an episode of Star Trek. That key may then be used to pull additional extended data from Cisco LocateTV (an online web source for TV metadata).

In accordance with the exemplary embodiment of FIG. 1, metadata reader 200D may be configured to extract timeline elements from the playout and/or content metadata in video content 10.

System 100 may also be configured to address other axes of analysis as well. For example, video analyzer 200A may be configured to analyze the visual elements of the TV show in video content 10 in order to detect timeline elements. Such visual timeline elements may include, for example, camera movements—e.g. pan, zoom, cross-cut, fade, dolly, crane, etc; face detection, counts, sizes and/or recognition; in video text reading; number and frequency of cuts; movement vectors and quantities; average colors; and/or product/logo recognition. It will be appreciated that video analyzer 200A may comprise and/or employ any suitable functionality such as are known in the art to detect and isolate such visual timeline elements. For example, video analyzer 200A may comprise or employ face recognition software and/or any known or proprietary video analysis techniques such as color histogram or edge detection that may be configured to detect and/or isolate such visual elements.

Audio analyzer 200B may be configured to detect audio timeline elements of video content 10. It will be appreciated that such audio timeline elements may include, but are not limited to, human speech. Such audio timeline elements may include, for example, average loudness over a time range; discontinuities; laughter and applause; music; music vs. speech balance; music volume and duration; a speaker's identity; and language phrenology. It will be appreciated that audio analyzer 200B may comprise and/or employ any suitable techniques such as those derived from signal processing such as are known in the art to detect and isolate such audio timeline elements.

Language analyzer 200C may be configured to analyze language timeline elements of video content 10. Such language timeline elements may include, for example, language; statistically anomalous words and phrases; lexicon size; noun depth; noun, verb, adjective ratios; domain specific vocabularies; profanity; racial slurs; region specific phrases; and/or historic or archaic phrases. It will be appreciated that language analyzer 200C may comprise and/or employ any suitable functionality such as are known in the art to detect and isolate such language timeline elements. For example, language analyzer 200C may comprise or employ speech recognition software and/or any known or proprietary language analysis techniques such as natural language processing or corpus linguistics that may be configured to detect and/or isolate such language timeline elements.

It will be appreciated that the hereinabove disclosed lists of timeline elements detected by modules 200 may be exemplary. In operation, modules 200 may be configurable to detect some or all of the disclosed elements. Similarly, in operation modules 200 may be configured to detect other timeline elements associated with the relevant axes of analysis that may not be explicitly disclosed herein. It will also be appreciated that in some embodiments, system 100 may not be configured with all of modules 200. For example, system 100 may be configured with only one or two of modules 200A-C.

The elements detected by modules 200 may be forwarded to element interpreter 300. Element interpreter 300 may comprise interpretation database 305. Interpretation database 305 may comprise a class/element interpretation table for interpreting timeline elements such as those detected by modules 200. An exemplary class/element interpretation table 310 is depicted in FIG. 3, to which reference is now also made. Table 310 comprises columns class 315, element 325 and inference 335. Class 315 may refer to the type of timeline element, e.g. audio, visual, language, etc. Element 325 may refer to a specific instance of class 315. Inference 335 may refer to a specific state or context to be inferred from an occurrence of element 325 in the timeline.

Element interpreter 300 interprets (step 630) the elements in accordance with the entries in table 310 as a timeline state indicative of a given state or context associated with a point or period in time during the timeline of video content 10. For example, as shown in FIG. 3, if video analyzer 200A detected a zooming crane shot, interpreter 300 may interpret the element to indicate that video content 10 may be a big budget show with high production values. Similarly, if audio analyzer 200B detected multiple screams, interpreter 300 may interpret the element to indicate that video content 10 may be a horror show. If audio analyzer 200B detected a period of raised voices interpreter 300 may interpret the element to indicate a timeline state of a climactic scene in video content 10. It will be appreciated that any suitable method such as known in the art may be used to populate and/or update class interpretation table 310. For example, the entries may be determined or updated in accordance with probabilistic models that may analyze historical or current data. Table 310 may also be populated or updated manually based on human supposition.

It will be appreciated that while the multiple axes of analysis may provide richer understanding of video content 10, inferences 335 as assigned by interpreter 300 may be made in isolation. A single inference 335 on its own may not be deemed to give a comprehensive view of video content 10. Accordingly, inferences 335 are forwarded to timeline metadata generator engine 400 to be combined in multi-variable analysis, to provide a more complete analysis of video content 10 with a generally higher likelihood of correctness and value.

Timeline metadata generator engine 400 comprises timeline rules database 405. Database 405 may comprise a set of rules for combining inferences 335 to make overall judgments about video content 10 and/or specific timeline points therein.

Engine 400 may use the set of rules to process inferences 335. One or more individual inferences 335 may be processed at a time, depending on the construction of a given rule; the rules may allow for individual inferences 335 to be combined in various ways. For example, the individual rules maybe chained together with logical operators, such as 'r1 and r2', 'r1 or r2', 'r1 and not r2, etc. Rules may also be connected temporally, such as 'r1 followed by r2', 'r1 at least x minutes before r2', 'r1 at same time as r2', etc. Rules may also be executed iteratively, for example 'r1 happened x times', 'r1 is increasing each time', 'more r1 than r2 over time'. It will be appreciated that there are many such mathematical, logical and procedural ways of combining these rules into rule-sets. The resulting combined entity may be assigned a probability of correctness as per the relevant rule. Individual inferences 335 may also have an individual value expressed as a probability of correctness. However, the probability of correctness of a combined entity may not necessarily be a direct function of the probability of correctness of its component inferences 335.

Examples of combined entities may include:

Long sections with low dialog+High motion in video+Noun rich vocabulary+Loud music=male orientated action movie Cross cutting+Dense dialog+High faces as percentage of screen real-estate+Word complexity high=intellectual movie aimed at educated individuals Finance specific vocabulary+Dense dialog+No domain negative phrases+On-screen graphs=Opportunity for banking advert It will be appreciated that the probability of correctness for such combined entities may be at least a function of "element intensity", i.e. the number of long sections with low dialog observed; and/or "element presence", i.e. whether or not all of the inferences 335 associated with the rule are actually observed in the analyzed video content 10.

It will be appreciated that in practice these rule-sets may be complex. Their construction, combination, evaluation and execution may involve elements of machine learning, meta-heuristics and/or stochastic processes.

It will also be appreciated that at least some of the rules may not necessarily apply to video content 10 as a single entity. They may instead only apply to a portion of the content, such as a scene or a segment of a news show, thereby signifying a state specific to that portion of the content, i.e. timeline metadata. The exact scope of the rule may be defined as an attribute of the rule itself. It will similarly be appreciated that when video content 10 may be evaluated on a live broadcast, there may be latency in processing the signals to produce metadata.

The results of engine 400 may be output (step 650) as timeline metadata to timeline metadata database 410. It will be appreciated that such timeline metadata may be used for a variety of purposes, including, for example, content discovery, recommendation, viewer mood matching, etc. by television service providers, thus enabling them to provide a more personalized and relevant service to their viewers. It will be appreciated that the placement of television advertising generally relies on human factors. Ad placement decisions typically rely on experience led hunches, rather than any specific algorithms. This is somewhat due to the lack of context available around TV shows such that automatic algorithms could process them to make ad placement decisions. Accordingly, the timeline metadata provided by system 100 may enable advertisers to make more informed decisions about how to place their ads within more relevant shows, and/or to optimize their placement of ads with a given show on the main TV screen and/or a second screen. Accordingly, given the personalized nature of such second screen devices (e.g. a portable tablet) such contextual metadata may also have a personalized element to it too.

An exemplary list of use cases for timeline metadata may include:

Surfacing relevant content in a large video catalogue.
Matching TV shows to other shows.
Matching TV shows to the viewers' tastes.
Matching TV shows to the viewers' moods.
Placing relevant and contextual advertisements in and around the TV show.
Relevant product placement within the show
Supporting second screen applications with enriched, contextually relevant data
Generating contextually relevant advertising opportunities ("avails") on the main and/or other screens and display devices It will be appreciated that video content 10 is essentially a work of art, and as a work of art, it may be subject to different interpretations. It will accordingly be appreciated that as system 100 may derive timeline metadata directly from the information/content layer, it may in some cases provide insight to characteristics of video content that may or may not have been intentionally included in the production of video content 10. Accordingly, system 100 may provide information about video content 10 and its component elements that may not even be available or even known to its producers. As such, the generated timeline metadata may be of use to any entity that may require understanding the meaning and context of video content 10. Accordingly, timeline metadata may also be of benefit even when not viewed within the context of actually viewing the associated video content 10. For example, timeline metadata may be used "in a vacuum" to analyze the components and characteristics of successful/non-successful programs. Given that a specific television program is a hit, its timeline metadata may be "mapped" and compared to other successful/non-successful programs to characteristics that may be indicative of success or failure. Such contextual content analysis may therefore help predict what might work in a show or a movie or, help define why a series is/is not succeeding on a very granular level.

Such analysis may also serve to extract value from archived content for which there may be no other known demand. Content providers typically have a large back catalogue of such content which may often not exploited to its fullest. For example, the timeline metadata of a current hit may indicate that it has many similarities to an older television show that many longer be broadcast on a regular basis. The older television show may be returned to the broadcast schedule and may possibly enjoy greater than expected popularity due to its hitherto unnoticed similarity to the current hit show.

It will also be appreciated that timeline metadata may be used to enrich companion (second device) applications. Timeline metadata may provide an operationally efficient and comprehensive way to generate compelling second screen applications for use by operators, content providers and advertisers. Such applications may be benefit particularly from the opportunity to pinpoint offered services and content according to precise moments in video content 10 as identified by the timeline aspect of timeline metadata.

It will be appreciated that the usefulness of the timeline metadata generated by engine 400 may be at least in part a function of the quality and accuracy of the entries in class/element interpretation table 310 and the rules in database 405. It will therefore be appreciated that the operation of system 100 may be fine-tuned and improved by providing feedback regarding the usefulness of the timeline metadata generated by engine 400.

System 100 may therefore be configured with a closed feedback loop in order to help it adjust its probabilities of correctness or even the entries in in class/element interpretation table 310 and the rules in database 405. As shown in FIG. 1, element interpreter 300 may comprise feedback unit 350 and/or timeline metadata engine 400 may comprise feedback unit 450. Feedback units 350 and/or 450 may be configured to receive (step 660) feedback from external feedback sources 500. External feedback sources 500 may be, for example, television ratings services and/or third party service providers that use the generated timeline metadata to offer their services to viewers of video content 10. Other examples of feedback sources may include critics' reviews, social commentary and/or academic analysis. It will be appreciated that the feedback may also be given non-explicitly, for example an end user choosing to skip a video item or tune away, or not watch very much.

Feedback units 350 and/or 450 may use data from external feedback sources 500 to adjust (step 670) entries in class/element interpretation table 310 and/or the rules in database 405. For example, as per the example hereinabove, engine 400 may determine that video content 10 may be a male orientated action movie. Feedback data from a television rating service (i.e. external feedback source 500) may indicate how accurate that characterization may be. If such feedback consistently indicates that the actual viewing audience is indeed male for such video content 10, then feedback unit 450 may increase the probability of correctness for the associated rule. If the feedback indicates otherwise, feedback unit 450 may lower the probability. Similarly, the feedback may be used by feedback 350 to add or modify entries in class/element interpretation table 310. For example, element 325 with a value of "dominant color is constantly green" may have an inference 335 of "a grass based sport." However, it may also characterize a nature documentary. Depending on the feedback received over time from external feedback source 500 (i.e. a movie database, or an EPG), feedback unit 350 may adjust the probability of correctness of "a grass based sport" or even change the definition to "a nature documentary." The feedback engine may also adjust its probabilities by adding qualifiers to its rule set. For example it may add to "dominant color is constantly green" qualifier like "and also crowd noises" or "and also on-screen match clock" or "and not animal sounds". It will be appreciated that such qualifying rules may also be added or modified by a human monitoring the rules effectiveness.

Similarly, if the metadata is used to look for shows that favor a particular audience segment, the success (or failure) of delivering to that segment can be measured and fed back into system 100. These metrics may enable system 100 to adjust the rules to better target that audience in the future.

Such adjustment may be effected via inputs into its machine learning, meta-heuristics, stochastic processes and/or other such mathematical processes.

Other measurable targets may be click-thrus on ads, purchases, bookings, etc. Click-thrus for ads or other information may be particularly meaningful for second device applications that may run in parallel to video content 10. For example, the timeline metadata may indicate that video content 10 is currently showing a scene taking place in a vacation resort. The second device application may display an ad for booking a vacation to a similar resort. The rate at which viewers click through may indicate how accurately the timeline metadata describes the current scene.

A/B testing may also be used to provide feedback from external feedback sources 500. In such testing, the audience may be segmented and each segment given a differently weighted or executed rule, i.e. one segment may be given the "A" version, and another the "B" version. Feedback units 350 and 450 may adjust the associated probabilities for the different entries/rules based on the responses of the viewers to the different options. For example, a combined entity of inferences 335 may possibly be indicative of two different situations; e.g. either a gambling scene or a scene with a fortune teller. One audience may be provided with a click-thru for an online gambling site and the other segment may be provided with a click-thru for an astrology site. Based on a comparison of the click-thrus, it may be possible to determine which actual situation was depicted. Similarly, one or more "placebo" options may also be provided, i.e. click-thru options that are not particularly associated with the scene, as a control for randomness.

It will be appreciated that contextual metadata may emerge and evolve over time. For example, the term "western" was not associated with cowboy movies until sometime after the genre become popular. Accordingly, all such adjustments based on feedback may be iterative such that the efficacy of system 100 may improve over time. It will further be appreciated that these methods may run as autonomous closed loop methods that may not require human intervention and/or supervision. However, it will also be appreciated that system 100 may be configured to enable human review and intervention in the feedback process. Analysis of feedback from external feedback sources 500 may also be performed offline manually and/or in other automated systems. System 100 may also comprise user interfaces for the direct modification of databases 305 and 405.

It will be appreciated that the feedback loop as described hereinabove may enable system 100 to be updated in light of change over time in the real world. For example, a phrase may emerge which has negative connotations for a particular segment. The phrase "evil bankers" emerged over time after the Credit Crunch. System 100 may be taught to recognize that the existence of this phrase is a negative indicator and add that as a rider onto any existing rules it may have, for example such as rules that focus on finance specific vocabulary.

System 100 may also detect strands of meaning that may not be readily apparent from an isolated view of a television program. It will be appreciated that a typical television program may be an episode of a series, and may therefore share strands of meaning running between some or all of the other episodes. This creates an element of common meaning within the relevant set of episodes. One can, for example, expect the same theme, words and tones to be common across these episodes. Similar expectations may exist for movies in a franchise, or by a certain director, or with a certain star.

As will be described hereinbelow, system 100 may be configured with awareness of these strands included in the rules used by engine 400. This may facilitate an ever better judgment about the overall entity (e.g. a TV series) as it encounters more and more instances (e.g. episodes).

Such strands of meaning may also be used to analyze a number of movies by a specific director even if system 100 may not be configured with a robust rule concerning the overall set. Over time system 100 may detect, for example, see that the director movies are male orientated or action focused. In such manner, system 100 may be configured to provide a prediction for related content even before it is broadcast or released for distribution.

In accordance with embodiments of the present invention, system 100 may also comprise strand detector 700. Strand detector 700 may cross-reference the timeline elements detected by modules 200 with elements 325 in table 310 to detect recurring elements for which no inferences 335 have been defined. In such manner, strand detector 700 may detect new words or phrases as they become popular. For example, the word "selfie" was only recently introduced into common use in the English language. Strand detector 700 may detect recurring instances of such a word and flag it for analysis. In an embodiment of the present invention, strand detector may suggest a context for a newly detected phrase based on inferences 335 of other elements 325 detected in proximity. For example, over time, strand detector 700 may infer meaning or context from the proximity of "selfie" to other elements such as "smartphones", "latest craze" and "self-portrait". Based on these elements, strand detector 700 may suggest an inference 335 of "pop culture" or "photography" for "selfie".

Similarly, strand detector 700 may also check for rules in database 405 that address combinations of timeline elements that have been detected in close proximity in video content 10. For example, the phrase "one percent" has recently acquired new connotations when discussed in association with elements such as "rich", "exploit" and "economy". Based on recurring observations of the phrase "one percent" in proximity to such elements, strand detector 700 may suggest a new rule that uses the newly detected element (i.e. "one percent") to indicate "social commentary" or "economic fairness".

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention. The software components may also be provided via software as a service (saas) or as a "cloud-based" service.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub combination.

It will be appreciated by persons skilled in the art that the present invention is not limited by what has been particularly shown and described hereinabove. Rather the scope of the invention is defined by the appended claims and equivalents thereof:

What is claimed is:

1. A method implemented on a computing device for deriving timeline metadata for video content, the method comprising:
   detecting timeline elements of video content, wherein detecting the timeline elements comprises detecting visual timeline elements, audio timeline elements, and language timeline elements of at least a portion of the video content;
   mapping the timeline elements to a corresponding class in a database, the corresponding class comprising a type associated with the timeline elements;
   interpreting each of the timeline elements based the corresponding class to determine an individual context for the at least a portion of the video content;
   generating timeline metadata by forming combinations of individual contexts associated with the timeline elements associated with the at least a portion of the video content, wherein generating the timeline metadata comprises chaining together the individual contexts based on a set of rules to form the combinations; and
   providing personalized content to a second digital device configured to run a second device application in parallel to presentation of the video content on a first digital device, wherein the personalized content is personalized based on the timeline metadata associated with a scene being depicted in the at least a portion of the video content being provided on the first digital device, and wherein each of the first digital device and the second digital device is associated with a same user, wherein providing the personalized content comprises:
      providing a first version to a first audience based on a first inference the at least a portion of the video content;
      providing a second version to a second audience based on a second inference the at least a portion of the video content,
      determining the scene being depicted based on comparing click-thrus of the first audience and the second audience, and
      providing the personalized content to the second digital device based on the determined scene.

2. The method of claim 1, further comprising:
   augmenting the timeline elements with information from other data sources.

3. The method of claim 1, further comprising:
   assigning a probability of correctness to the timeline metadata.

4. The method of claim 3, further comprising:
   receiving feedback indicative of the correctness; and
   adjusting the probability based on the feedback.

5. The method of claim 4, wherein the receiving and the adjusting are performed iteratively.

6. The method of claim 4, wherein the feedback comprises feedback regarding at least two versions of the timeline metadata.

7. The method of claim 1, further comprising:
   detecting recurring timeline elements for which there are no associated inferences.

8. The method of claim 7, further comprising:
   determining timeline states for the recurring timeline elements based on at least timeline states of other timeline elements that have been observed in proximity to the recurring timeline elements.

9. The method of claim 1, further comprising:
   detecting recurring combinations of the timeline elements which are not addressed in the set of rules.

10. The method of claim 9, further comprising:
    determining new rules for the recurring combinations based on at least one existing rule for similar recurring combinations of timeline states, wherein at least one timeline state of the similar recurring combinations is associated with a timeline element in the recurring combinations of elements.

11. A video content timeline metadata generation system, the system comprising:
    a memory storage; and
    a processing unit coupled to the memory storage, wherein the processing unit is operative to:
       detect timeline elements associated with at least points in time in said a video content item, wherein the timeline elements comprises detecting visual timeline elements, audio timeline elements, and language timeline elements of at least points in time of the video content item;
       map the timeline elements to a corresponding class in a database, the corresponding class comprising a type associated with the timeline elements;
       interpret each of the timeline elements of the corresponding class to determine an individual context for the points in time of the video content item;
       generate timeline metadata by forming combinations of individual contexts associated with the timeline elements associated with the points in time of the video content item, wherein the individual contexts are chained based on a set of rules to derive the timeline metadata; and
       provide personalized content item to a second digital device configured to run a second device application in parallel to presentation of the video content item on a first digital device, wherein the personalized content item is personalized based on the timeline metadata associated with a scene depicted in the at least a portion of the video content item being provided on the first digital device, and wherein each of the first digital device and the second digital device is associated with a same user, wherein the processing unit being operative to provide the personalized content comprises the processing unit being operative to:
          provide a first version to a first audience based on a first inference the at least a portion of the video content,
          provide a second version to a second audience based on a second inference the at least a portion of the video content,
          determine the scene being depicted based on comparing click-thrus of the first audience and the second audience, and
          provide the personalized content to the second digital device based on the determined scene being depicted.

12. The system of claim 11 and wherein the processing unit is further operative to associate a probability for correctness for the timeline metadata.

13. The system of claim 12, wherein the processing unit is further operative to:
    receive feedback from external feedback sources regarding the probability of correctness; and
    adjust the probability of correctness in view of at least the feedback.

14. The system of claim 13, wherein the processing unit is further operative to receive the feedback and to adjust the probability of correctness iteratively.

15. The system of claim 11, the processing unit is further operative to detect recurring timeline elements for which there are associated inferences.

16. The system of claim 15 and wherein the processing unit is further operative to detect recurring combinations of the timeline elements which are not addressed in the set of rules.

17. A non-transitory computer-readable medium that stores a set of instructions which when executed perform a method executed by the set of instructions comprising:
    detecting timeline elements of media content, wherein detecting the timeline elements comprises detecting visual timeline elements, audio timeline elements, and language timeline elements of a portion of the media content;
    mapping the timeline elements to a corresponding class in a database, the corresponding class comprising a type associated with the timeline elements;
    interpreting each of the timeline elements for the corresponding class to determine an individual context for the portion of the media content;
    generating timeline metadata by forming combinations of individual contexts associated with the timeline elements associated with the portion of the media content, wherein generating the timeline metadata comprises chaining together the individual contexts based on a set of rules to form the combinations; and
    providing personalized content to a second digital device configured to run a second device application in parallel to presentation of the video content on a first digital device, wherein the personalized content is personalized based on the timeline metadata associated with the at least a portion of the video content being provided on a first digital device, and wherein each of the first digital device and the second digital device is associated with a same user, wherein providing the personalized content comprises:
    providing a first version to a first audience based on a first inference the at least a portion of the video content,
    providing a second version to a second audience based on a second inference the at least a portion of the video content,
    determining the scene being depicted based on comparing click-thrus of the first audience and the second audience, and
    providing the personalized content to the second digital device based on the determined scene being depicted.

18. The non-transitory computer-readable medium of claim 17, wherein an accuracy of the timeline metadata is determined from a rate at which the same user click through the personalized content.

19. The non-transitory computer-readable medium of claim 17, further comprising:
    associating a probability for correctness for the timeline metadata;
    receiving feedback from external feedback sources regarding the probability of correctness; and
    adjusting the probability of correctness in view of at least the feedback.

20. The non-transitory computer-readable medium of claim 17, wherein the receive and the adjusting is performed iteratively.

* * * * *